(12) United States Patent  (10) Patent No.: US 8,567,935 B2
André et al.  (45) Date of Patent: Oct. 29, 2013

(54) HYPERBRANCHED POLYMERIC DISPERSANTS AND NON-AQUEOUS PIGMENT DISPERSIONS

(75) Inventors: Xavier André, Antwerp (BE); Katrien Bernaerts, Overpelt (BE)

(73) Assignee: Agfa-Gevaert N.V., Mortsel (BE)

( * ) Notice: Subject to any disclaimer, the term of this patent is extended or adjusted under 35 U.S.C. 154(b) by 79 days.

(21) Appl. No.: 13/391,845

(22) PCT Filed: Sep. 8, 2010

(86) PCT No.: PCT/EP2010/063145
§ 371 (c)(1),
(2), (4) Date: Feb. 23, 2012

(87) PCT Pub. No.: WO2011/029831
PCT Pub. Date: Mar. 17, 2011

(65) Prior Publication Data
US 2012/0147086 A1   Jun. 14, 2012

Related U.S. Application Data (60) Provisional application No. 61/241,035, filed on Sep. 10, 2009.

(30) Foreign Application Priority Data

Sep. 9, 2009 (EP) ..................... 09169812

(51) Int. Cl.
*C09D 11/00* (2006.01)
(52) U.S. Cl.
USPC ........................ 347/100; 106/31.13
(58) Field of Classification Search
USPC ........................ 347/100; 106/31.13
See application file for complete search history.

(56) References Cited

U.S. PATENT DOCUMENTS

| 4,647,647 A | 3/1987 | Haubennestel et al. |
| 2004/0163570 A1* | 8/2004 | Vanmaele et al. ......... 106/31.13 |
| 2006/0119679 A1* | 6/2006 | Kruger et al. ................. 347/100 |

FOREIGN PATENT DOCUMENTS

| EP | 0 154 678 A1 | 9/1985 |
| EP | 1 624 033 A2 | 2/2006 |
| EP | 1 790 697 A1 | 5/2007 |
| EP | 1 790 698 A1 | 5/2007 |
| WO | 03/027162 A1 | 4/2003 |
| WO | 2007/006635 A2 | 1/2007 |
| WO | 2007/060254 A2 | 5/2007 |

OTHER PUBLICATIONS

Official Communication issued in International Patent Application No. PCT/EP2010/063145, mailed on Nov. 5, 2010.

* cited by examiner

*Primary Examiner* — Laura Martin
(74) *Attorney, Agent, or Firm* — Keating & Bennett, LLP (57) ABSTRACT

A polymeric dispersant having a hyperbranched polyurethane architecture obtained by reacting a polyisocyanate core with a mixture of:
a) 40 to 65 mol % of an anchor represented by Formula (I) and/or (II):

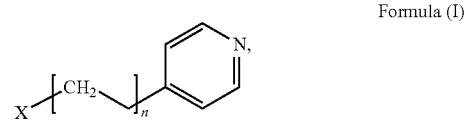

Formula (I)

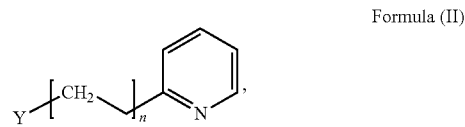

Formula (II)

wherein n represents an integer selected from 0 to 7; and
X and Y each independently represent a primary amine group or a hydroxyl group;
b) 5 to 25 mol % of a polypropylene oxide crosslinker;
c) 15 to 40 mol % of a polypropylene oxide graft; and
wherein the amount of the crosslinker and the graft taken together is at least 35 mol %;
and wherein 100 mol % of the mixture corresponds with the total amount of isocyanate groups in the polyisocyanate core.

19 Claims, 1 Drawing Sheet

HYPERBRANCHED POLYMERIC DISPERSANTS AND NON-AQUEOUS PIGMENT DISPERSIONS

CROSS-REFERENCE TO RELATED APPLICATIONS

This application is a 371 National Stage Application of PCT/EP2010/063145, filed Sep. 8, 2010. This application claims the benefit of U.S. Provisional Application No. 61/241,035, filed Sep. 10, 2009, which is incorporated by reference herein in its entirety. In addition, this application claims the benefit of European Application No. 09169812.6, filed Sep. 9, 2009, which is also incorporated by reference herein in its entirety.

BACKGROUND OF THE INVENTION

1. Field of the Invention

The present invention relates to specific polymeric dispersants and stable non-aqueous pigment dispersions and inkjet inks made with the specific polymeric dispersants.

2. Description of the Related Art

A dispersant is a substance for promoting the formation and stabilization of a dispersion of pigment particles in a dispersion medium and for substantially reducing the dispersing energy required. Dispersed pigment particles may have a tendency to re-agglomerate after the dispersing operation, due to mutual attraction forces. The use of dispersants counteracts this re-agglomeration tendency of the pigment particles.

The dispersant has to meet particularly high requirements when used for inkjet inks. Inadequate dispersing manifests itself as increased viscosity in liquid systems, loss of brilliance and/or hue shifts. Moreover, particularly good dispersion of the pigment particles is required to ensure unimpeded passage of pigment particles through the nozzles of a print head, which are usually only a few micrometers in diameter. In addition, pigment particle agglomeration and the associated blockage of the printer nozzles has to be avoided in the standby periods of the printer.

Polymeric dispersants typically contain in one part of the molecule so-called anchor groups, which adsorb onto the pigments to be dispersed. In a spatially separate part of the molecule, polymeric dispersants have polymer chains compatible with the dispersion medium, thus stabilizing the pigment particles in the dispersion medium. Typical polymeric dispersants include graft copolymer and block copolymer dispersants.

In aqueous inkjet inks, the polymeric dispersants generally contain hydrophobic anchor groups exhibiting a high affinity for the pigment surface and hydrophilic polymer chains for stabilizing the pigments in the aqueous dispersion medium.

The preparation of good thermally stable dispersions with submicron particles is more difficult for non-aqueous pigment dispersions, such as solvent based, oil based and radiation curable inkjet inks. The pigments are especially difficult to disperse when they have a non-polar surface.

These problems have led to the design of very specific polymeric dispersants wherein the anchor groups are pigment derivatives. For example, WO 2007/006635 (AGFA GRAPHICS) discloses pigment dispersions comprising a colour pigment and a polymeric dispersant having via a linking group covalently linked to its polymeric backbone at least one pending chromophore group which has a molecular weight smaller than 90% of the molecular weight of the colour pigment. A disadvantage is that the pending chromophore group must bear some similarity to the chemical formula of the pigment in order to obtain effective dispersion, which as a consequence results in different polymeric dispersants for the different pigments used in an ink set containing yellow, magenta and cyan inks.

Another approach for dispersing pigments with non-polar surfaces in non-aqueous dispersion media is changing the surface to a more polar surface by addition of compounds known as dispersion synergists. A dispersion synergist is a compound that promotes the adsorption of the polymeric dispersant on the surface of the pigment. It is often suggested that the synergist should possess the pigment structure substituted by one or more sulphonic acid groups, carboxylic acid groups or ammonium salts thereof. Examples of these dispersion synergists are given in, for example, WO 2007/060254 (AGFA GRAPHICS), EP 1790697 A (AGFA GRAPHICS) and EP 1790698 A (AGFA GRAPHICS).

However, both approaches lead to a considerable higher cost of the pigment dispersion. It is desirable to make stable pigment dispersions not requiring dispersion synergists or polymeric dispersants wherein the anchor groups are pigment derivatives. For consistent image quality, inkjet inks require a dispersion stability capable of dealing with high temperatures (above 60° C.) during transport of the ink to a customer, jetting at elevated temperatures and changes in the dispersion medium of the inkjet ink during use, for example, evaporation of solvent and increasing concentrations of humectants, penetrants and other additives.

U.S. Pat. No. 4,647,647 (BYK-CHEMIE) discloses dispersing agents obtained by the reaction of polyisocyanates having an average functionality of from 2.5 to 6 with specific monohydroxyl compounds of polyethers, polyesters or mixed polyether-polyesters. Different heterocyclic groups including triazole, pyrimidine, imidazole, pyridine, morpholine, pyrrolidine, piperazine, benzimidazole, benzothiazole and/or triazine are suggested as anchor group.

Therefore, it is highly desirable to manufacture low cost non-aqueous pigment dispersions, especially pigmented inkjet inks, exhibiting a high dispersion quality and stability using the same polymeric dispersant in all inks of an ink set.

SUMMARY OF THE INVENTION

In order to overcome the problems described above, it has been surprisingly found that non-aqueous pigment dispersions, especially non-aqueous inkjet inks, of high dispersion quality and stability were obtained by using a polymeric dispersant as defined below. The stabilization of pigments was accomplished without an expensive surface modification by addition of a dispersion synergist and by using the same "universal" polymeric dispersant in the different inks of a CMY ink set.

A further advantage and benefit of the present invention produces images of high image quality with non-aqueous pigment dispersions, especially with non-aqueous inkjet inks.

Other features, elements, steps, characteristics and advantages of the present invention will become more apparent from the following detailed description of preferred embodiments of the present invention hereinafter.

DETAILED DESCRIPTION OF THE PREFERRED EMBODIMENTS

The term "colorant", as used in the preferred embodiments of the present invention, means dyes and pigments.

The term "dye", as used in the preferred embodiments of the present invention means a colorant having a solubility of 10 mg/L or more in the medium in which it is applied and under the ambient conditions pertaining.

The term "pigment" is defined in DIN 55943, herein incorporated by reference, as a colouring agent that is practically insoluble in the application medium under the pertaining ambient conditions, hence having a solubility of less than 10 mg/L therein.

The term "C.I." is used in disclosing the present application as an abbreviation for Colour Index.

The term "alkyl" means all variants possible for each number of carbon atoms in the alkyl group i.e. for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethylpropyl and 2-methylbutyl etc.

The term "PPO" is used as an abbreviation for polypropylene oxide.

The term "PEO" is used as an abbreviation for polyethylene oxide.

Polymeric Dispersants

The polymeric dispersant according to a preferred embodiment of the present invention has a hyperbranched polyurethane architecture obtained by reacting a polyisocyanate core with a mixture of a) 40 to 65 mol % of an anchor represented by Formula (I) and/or (II):

Formula (I)

Formula (II)

wherein n represents an integer selected from 0 to 7; and X and Y each independently represent a primary amine group or a hydroxyl group;

b) 5 to 25 mol % of a polypropylene oxide crosslinker;

c) 15 to 40 mol % of a polypropylene oxide graft; and
wherein the amount of the crosslinker and the graft taken together is at least 35 mol %; and
wherein 100 mol % of the mixture corresponds with the total amount of isocyanate groups in the polyisocyanate core.

The polymeric dispersant according to a preferred embodiment has an average numerical molecular weight $M_n$ of less than 25,000.

Hyperbranched Polyurethane Architecture

The term "hyperbranched" as used in disclosing a preferred embodiment of the present invention, means a polymer having a plurality of branch points and multifunctional branches that lead to further branching with polymer growth.

Hyperbranched polymers form a polydisperse system with varying degrees of branching (DB<100%).

Figure 1:
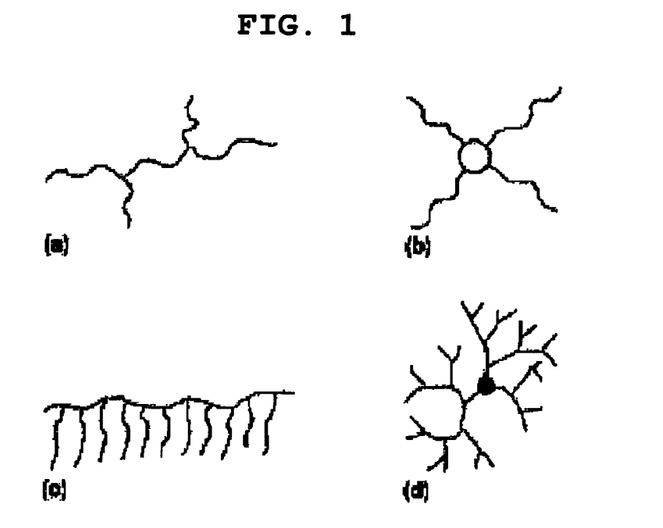
FIG. 1 shows branched polymer types (a) to (d).

FIG. 1 shows branched polymers roughly divided into 4 polymeric types (a) to (d).

In the schematic representation shown in FIG. 1:
(a) represents a branched polymer (if arms are of composition similar to backbone) or a graft polymer (if compositions are different);
(b) represents a star polymer;
(c) represents a comb polymer; and
(d) represents a dendritic polymer.

Figure 2:
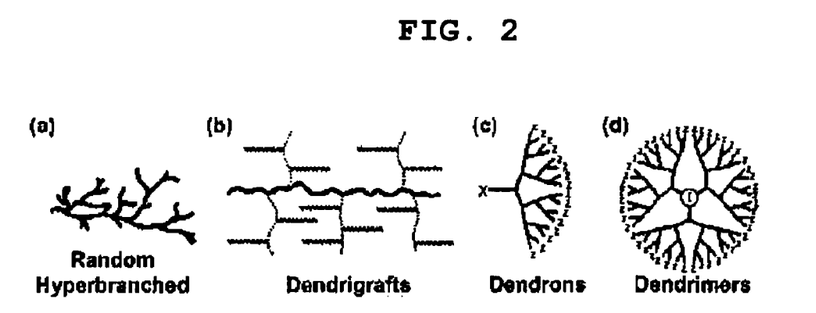
FIG. 2 shows dendritic polymers (a) to (d).

FIG. 2 shows dendritic polymers subdivided into hyperbranched (a), dendrigrafts (b), dendrons (c) and dendrimers (d).

Preferred polyisocyanate cores are described at col. 4, line 5 to col. 5, line 68 U.S. Pat. No. 4,647,647 (BYK-CHEMIE), herein incorporated as a specific reference.

Suitable polyisocyanate cores include an aromatic polyisocyanate based on toluene diisocyanate (TDI), e.g. DESMODUR™ IL grades from Bayer MaterialScience; and a polyisocyanate copolymer based on toluene diisocyanate (TDI) and hexamethylene diisocyanate (HDI), e.g. DESMODUR™ HL grades from Bayer MaterialScience.

Other suitable commercial products include POLURENE™ KC, POLURENE™ HR and Tolylene diisocyanate-isophorone diisocyanate-isocyanurate all available for SAPICI and trimeric isophoronediisocyanate available as isocyanurate-T1890 from Chemische Werke Plus.

Crosslinkers

The polymeric dispersant according to a preferred embodiment of the present invention is obtained by reacting a polyisocyanate core with a mixture containing 5 to 25 mol % of a polypropylene oxide crosslinker, more preferably containing 15 to 25 mol % of polypropylene oxide crosslinker.

The polypropylene oxide crosslinker preferably has an average numerical molecular weight $M_n$ between 400 and 10,000, more preferably between 400 and 2,500.

Suitable crosslinkers are shown in Table 1 wherein each time X represents a primary amine group, a hydroxyl group or a thiol group.

TABLE 1 with z representing an integer from 2 to 210 with z representing an integer from 1 to 250
with o representing an integer from 1 to 200

TABLE 1-continued with n representing an integer from 1 to 250
with m representing an integer from 1 to 250
with o representing an integer from 1 to 100
with p representing an integer from 1 to 100 with n = 1 to 200 and m + o = 1 to 150
Y = polymeric segment (e.g. polysiloxane, polylactide, polyester, polyamide (polypeptide), poly(meth)acrylic, poly(meth)acrylate or polystyrenic segment)
Q = bifunctional coupling reagent (e.g. a diisocyanate group or an initiating fragment for radical polymerization)

In a more preferred embodiment the polypropylene oxide crosslinker contains no ethylene oxide subunits.

In an even more preferred embodiment the polypropylene oxide crosslinker contains only propylene oxide subunits. Crosslinkers containing only propylene oxide subunits exhibited superior dispersion quality compared to polypropylene oxide crosslinkers containing ethylene oxide subunits.

Grafts

The polymeric dispersant according to a preferred embodiment of the present invention is obtained by reacting a polyisocyanate core with a mixture containing 15 to 40 mol % of a polypropylene oxide graft, more preferably containing 25 to 35 mol % of polypropylene oxide graft.

The polypropylene oxide graft preferably has an average numerical molecular weight $M_n$ between 500 and 10,000, more preferably between 500 and 5,000.

Suitable polypropylene oxide grafts are shown in Table 2 wherein each time X represents a primary amine group, a hydroxyl group or a thiol group and R represents an optionally substituted alkyl group, an optionally substituted aryl group, an optionally substituted aralkyl group or an optionally substituted alkoxy group. Suitable substitutions in the R group include hydroxyl, thiol, amine, ether, cyano, nitro, carboxyl, ester, carbonate, amide, oxalyl, oxalylamide, urea, carbamate and thiocarbamate functional groups.

TABLE 2 with z representing an integer from 2 to 100 with z representing an integer from 1 to 250
with o representing an integer from 1 to 250

TABLE 2-continued with n representing an integer from 1 to 250
with m representing an integer from 1 to 200
with o representing an integer from 1 to 100
with p representing an integer from 1 to 100 with n = 1 to 200, m + o = 1 to 150 or with n = 1 to 200, o = 1 to 150 or with n = 1 to 200, o = 1 to 150
Y = polymeric segment (e.g. polysiloxane, polylactide, polyester, polyamide (polypeptide), poly(meth)acrylic,
poly(meth)acrylate or polystyrenic segment)
Q = bifunctional coupling reagent (e.g. a diisocyanate group, a dicarbamate group, a diurea group, a dithiolurea
group, an initiating fragment for radical polymerization, an optionally substituted alkyl group, an optionally
substituted aryl group, an optionally substituted aralkyl group or an optionally substituted alkoxy group)

In a more preferred embodiment the polypropylene oxide graft contains no ethylene oxide subunits.

In an even more preferred embodiment the polypropylene oxide graft contains only propylene oxide subunits. Grafts containing only propylene oxide subunits exhibited superior dispersion quality compared to polypropylene oxide grafts containing ethylene oxide subunits.

Anchors

The polymeric dispersant according to a preferred embodiment of the present invention is obtained by reacting a polyisocyanate core with a mixture containing 40 to 65 mol % of an anchor represented by Formula (I) and/or (II):

Formula (I)

Formula (II)

wherein n represents an integer selected from 0 to 4; and wherein X and Y each independently represent a primary amine group or a hydroxyl group.

In a preferred embodiment of the polymeric dispersant, X and Y both represent a primary amine group.

In a preferred embodiment, the polymeric dispersant comprises 50 to 60 mol % of the anchor represented by Formula (I) and/or (II).

In a preferred embodiment, n=1 in Formula (I) or (II).

Surprisingly only the anchor groups represented by Formula (I) and (II) incorporated in the polymeric dispersant delivered good dispersion quality and stability, while other heterocyclic N-containing anchor groups such as, for example, imidazole or morpholine did not.

Non-Aqueous Pigment Dispersions

The non-aqueous pigment dispersion according to a preferred embodiment of the present invention includes in a non-aqueous dispersion medium at least one pigment and the polymeric dispersant according to a preferred embodiment of the present invention.

In a preferred embodiment, the non-aqueous pigment dispersion is curable by UV radiation or e-beam.

In a preferred embodiment, the non-aqueous pigment dispersion is an inkjet ink, more preferably an inkjet ink curable by UV radiation or e-beam.

The non-aqueous pigmented dispersion according to a preferred embodiment of the present invention may further also contain at least one surfactant to control the homogenous spreading of the pigment dispersion on a substrate. For a non-aqueous pigmented inkjet ink, the surfactant is important to control the dot size of the ink droplet on a substrate.

In a preferred embodiment the non-aqueous pigmented dispersion is a non-aqueous inkjet ink containing at least one humectant to prevent the clogging of the nozzle, due to its ability to slow down the evaporation rate of ink.

The viscosity of an inkjet ink is preferably lower than 30 mPa·s, more preferably lower than 15 mPa·s, and most preferably between 2 and 10 mPa·s at a shear rate of 100 s$^{-1}$ and a jetting temperature between 10 and 70° C.

The non-aqueous inkjet ink forms preferably part of a non-aqueous CMY or CMYK inkjet ink set. The non-aqueous inkjet ink set may also be extended with extra inks such as red, green, blue, and/or orange to further enlarge the colour gamut of the image. The ink set may also be extended by the combination of full density and light density inks of both colour inks and/or black inks to improve the image quality by lowered graininess.

Pigments

The pigments may be black, white, cyan, magenta, yellow, red, orange, violet, blue, green, brown, mixtures thereof, and the like. A colour pigment may be chosen from those disclosed by HERBST, Willy, et al. Industrial Organic Pigments, Production, Properties, Applications. 3rd edition. Wiley-VCH, 2004. ISBN 3527305769.

Suitable pigments are disclosed in paragraphs [0128] to [0138] of WO 2008/074548 (AGFA GRAPHICS).

Also mixed crystals may be used. Mixed crystals are also referred to as solid solutions. For example, under certain conditions different quinacridones mix with each other to form solid solutions, which are quite different from both physical mixtures of the compounds and from the compounds themselves. In a solid solution, the molecules of the components enter into the same crystal lattice, usually, but not always, that of one of the components. The x-ray diffraction pattern of the resulting crystalline solid is characteristic of that solid and can be clearly differentiated from the pattern of a physical mixture of the same components in the same proportion. In such physical mixtures, the x-ray pattern of each of the components can be distinguished, and the disappearance of many of these lines is one of the criteria of the formation of solid solutions. A commercially available example is CINQUASIA™ Magenta RT-355-D from Ciba Specialty Chemicals.

Also mixtures of pigments may be used in the pigment dispersions. For some inkjet applications, a neutral black inkjet ink is preferred and can be obtained, for example, by mixing a black pigment and a cyan pigment into the ink. The inkjet application may also require one or more spot colours, for example for packaging inkjet printing or textile inkjet printing. Silver and gold are often desired colours for inkjet poster printing and point-of-sales displays.

Non-organic pigments may be used in the pigment dispersions. Particular preferred pigments are C.I. Pigment Metal 1, 2 and 3. Illustrative examples of the inorganic pigments include red iron oxide (III), cadmium red, ultramarine blue, prussian blue, chromium oxide green, cobalt green, amber, titanium black and synthetic iron black.

Pigment particles in inkjet inks should be sufficiently small to permit free flow of the ink through the inkjet-printing device, especially at the ejecting nozzles. It is also desirable to use small particles for maximum colour strength and to slow down sedimentation.

The numeric average pigment particle size is preferably between 0.050 and 1 μm, more preferably between 0.070 and 0.300 μm and particularly preferably between 0.080 and 0.200 μm. Most preferably, the numeric average pigment particle size is no larger than 0.150 μm. An average particle size smaller than 0.050 μm is less desirable for decreased light-fastness, but mainly also because very small pigment particles or individual pigment molecules thereof may still be extracted in food packaging applications. The average particle size of pigment particles is determined with a Brookhaven Instruments Particle Sizer BI90plus based upon the principle of dynamic light scattering. The ink is diluted with ethyl acetate to a pigment concentration of 0.002 wt %. The measurement settings of the BI90plus are: 5 runs at 23° C., angle of 90°, wavelength of 635 nm and graphics=correction function However for white pigment dispersions, the numeric average particle diameter of the white pigment is preferably from 50 to 500 nm, more preferably from 150 to 400 nm, and most preferably from 200 to 350 nm. Sufficient hiding power cannot be obtained when the average diameter is less than 50 nm, and the storage ability and the jet-out suitability of the ink tend to be degraded when the average diameter exceeds 500 nm. The determination of the numeric average particle diameter is best performed by photon correlation spectroscopy at a wavelength of 633 nm with a 4 mW HeNe laser on a diluted sample of the pigmented inkjet ink. A suitable particle size analyzer used was a MALVERN™ nano-S available from Goffin-Meyvis. A sample can, for example, be prepared by addition of one drop of ink to a cuvette containing 1.5 mL ethyl acetate and mixed until a homogenous sample was obtained. The measured particle size is the average value of 3 consecutive measurements consisting of 6 runs of 20 seconds.

Suitable white pigments are given by Table 2 in [0116] of WO 2008/074548 (AGFA GRAPHICS). The white pigment is preferably a pigment with a refractive index greater than 1.60. The white pigments may be employed singly or in combination. Preferably titanium dioxide is used as pigment with a refractive index greater than 1.60. Suitable titanium dioxide pigments are those disclosed in [0117] and in [0118] of WO 2008/074548 (AGFA GRAPHICS).

The pigments are present in the range of 0.01 to 15%, more preferably in the range of 0.05 to 10% by weight and most preferably in the range of 0.1 to 5% by weight, each based on the total weight of the pigment dispersion. For white pigment dispersions, the white pigment is preferably present in an amount of 3% to 30% by weight of the pigment dispersion, and more preferably 5% to 25%. An amount of less than 3% by weight cannot achieve sufficient covering power and usually exhibits very poor storage stability and ejection property.

Non-Aqueous Dispersion Media

The dispersion medium used in the pigment dispersion according to a preferred embodiment of the present invention is a non-aqueous liquid. The dispersion medium may consist of organic solvent(s).

Suitable organic solvents include alcohols, aromatic hydrocarbons, ketones, esters, aliphatic hydrocarbons, higher fatty acids, carbitols, cellosolves, higher fatty acid esters. Suitable alcohols include methanol, ethanol, propanol and 1-butanol, 1-pentanol, 2-butanol, t.-butanol. Suitable aromatic hydrocarbons include toluene, and xylene. Suitable ketones include methyl ethyl ketone, methyl isobutyl ketone, 2,4-pentanedione and hexafluoroacetone. Also glycol, glycolethers, N-methylpyrrolidone, N,N-dimethylacetamid, N,N-dimethylformamid may be used.

Suitable examples of organic solvents are disclosed in [0133] to [0146] of EP 1857510 A (AGFA GRAPHICS).

If the pigment dispersion is a curable pigment dispersion or inkjet ink, organic solvent(s) are preferably replaced by one or more monomers and/or oligomers to obtain the liquid dispersion medium. Sometimes, it can be advantageous to add a small amount of an organic solvent to improve the dissolution of the dispersant. The content of organic solvent should be lower than 20 wt %, more preferably lower than 5 wt % based on the total weight of the pigmented inkjet ink and most preferably the curable pigment dispersion doesn't include any organic solvent.

For oil based pigment dispersions and inkjet inks the dispersion medium can be any suitable oil including aromatic oils, paraffinic oils, extracted paraffinic oils, naphthenic oils, extracted napthenic oils, hydrotreated light or heavy oils, vegetable oils and derivatives and mixtures thereof. Paraffinic oils can be normal paraffin types (octane and higher alkanes), isoparaffins (isooctane and higher iso-alkanes) and cycloparaffins (cyclooctane and higher cyclo-alkanes) and mixtures of paraffin oils.

Suitable examples of oils are disclosed in [0151] to [0164] of EP 1857510 A (AGFA GRAPHICS).

Monomers and Oligomers

The monomers and oligomers used in radiation curable pigment dispersions and inks, especially for food packaging applications, are preferably purified compounds having no or almost no impurities, more particularly no toxic or carcinogenic impurities. The impurities are usually derivative compounds obtained during synthesis of the polymerizable compound. Sometimes, however, some compounds may be added deliberately to pure polymerizable compounds in harmless amounts, for example, polymerization inhibitors or stabilizers.

Any monomer or oligomer capable of free radical polymerization may be used as polymerizable compound. A combination of monomers, oligomers and/or prepolymers may also be used. The monomers, oligomers and/or prepolymers may possess different degrees of functionality, and a mixture including combinations of mono-, di-, tri- and higher functionality monomers, oligomers and/or prepolymers may be used. The viscosity of the radiation curable compositions and inks can be adjusted by varying the ratio between the monomers and oligomers.

Particularly preferred monomers and oligomers are those listed in [0106] to [0115] in EP 1911814 A (AGFA GRAPHICS) incorporated herein as a specific reference.

A preferred class of monomers and oligomers are vinyl ether acrylates such as those described in U.S. Pat. No. 6,310,115 (AGFA), incorporated herein by reference. Particularly preferred compounds are 2-(2-vinyloxyethoxy)ethyl(meth) acrylate, most preferably the compound is 2-(2-vinyloxyethoxy)ethyl acrylate.

Photoinitiators

If the pigment dispersion or ink is radiation curable, preferably one or more photoinitiators are present in the pigment dispersion or ink.

The photoinitiator is preferably a free radical initiator. A free radical photoinitiator is a chemical compound that initiates a polymerization of monomers and oligomers when exposed to actinic radiation by the formation of a free radical.

Two types of free radical photoinitiators can be distinguished and used in the pigment dispersion or ink of a preferred embodiment of the present invention. A Norrish Type I initiator is an initiator which cleaves after excitation, yielding the initiating radical immediately. A Norrish type II-initiator is a photoinitiator which is activated by actinic radiation and forms free radicals by hydrogen abstraction from a second compound that becomes the actual initiating free radical. This second compound is called a polymerization synergist or co-initiator. Both type I and type II photoinitiators can be used in a preferred embodiment of the present invention, alone or in combination.

Suitable photo-initiators are disclosed in CRIVELLO, J. V., et al. VOLUME III: Photoinitiators for Free Radical Cationic. 2nd edition. Edited by BRADLEY, G. London, UK: John Wiley and Sons Ltd, 1998. p. 287-294.

Specific examples of photo-initiators may include, but are not limited to, the following compounds or combinations thereof: benzophenone and substituted benzophenones, 1-hydroxycyclohexyl phenyl ketone, thioxanthones such as isopropylthioxanthone, 2-hydroxy-2-methyl-1-phenylpropan-1-one, 2-benzyl-2-dimethylamino-(4-morpholinophenyl) butan-1-one, benzil dimethylketal, bis(2,6-dimethylbenzoyl)-2,4,4-trimethylpentylphosphine oxide, 2,4,6-trimethylbenzoyldiphenylphosphine oxide, 2-methyl-1-[4-(methylthio) phenyl]-2-morpholinopropan-1-one, 2,2-dimethoxy-1,2-diphenylethan-1-one or 5,7-diiodo-3-butoxy-6-fluorone, diphenyliodonium fluoride and triphenylsulfonium hexafluophosphate.

Suitable commercial photo-initiators include IRGACURE™ 184, IRGACURE™ 500, IRGACURE™ 907, IRGACURE™ 369, IRGACURE™ 1700, IRGACURE™ 651, IRGACURE™ 819, IRGACURE™ 1000, IRGACURE™ 1300, IRGACURE™ 1870, DAROCUR™ 1173, DAROCUR™ 2959, DAROCUR™ 4265 and DAROCUR™ ITX available from CIBA SPECIALTY CHEMICALS, LUCERIN™ TPO available from BASF AG, ESACURE™ KT046, ESACURE™ KIP150, ESACURE™ KT37 and ESACURE™ EDB available from LAMBERTI, H-NU™ 470 and H-NU™ 470X available from SPECTRA GROUP Ltd.

Suitable cationic photo-initiators include compounds, which form aprotic acids or Bronstead acids upon exposure to ultraviolet and/or visible light sufficient to initiate polymerization. The photo-initiator used may be a single compound, a mixture of two or more active compounds, or a combination of two or more different compounds, i.e. co-initiators. Non-limiting examples of suitable cationic photo-initiators are aryldiazonium salts, diaryliodonium salts, triarylsulphonium salts, triarylselenonium salts and the like.

However for safety reasons, in particular for food packaging applications, the photoinitiator is preferably a so-called diffusion hindered photoinitiator. A diffusion hindered photoinitiator is a photoinitiator which exhibits a much lower mobility in a cured layer of the curable liquid or ink than a monofunctional photoinitiator, such as benzophenone. Several methods can be used to lower the mobility of the photoinitiator. One way is to increase the molecular weight of the photoinitiator so that the diffusion speed is reduced, e.g. difunctional photoinitiators or polymeric photoinitiators. Another way is to increase its reactivity so that it is built into the polymerizing network, e.g. multifunctional photoinitiators and polymerizable photoinitiators. The diffusion hindered photoinitiator is preferably selected from the group consisting of non-polymeric di- or multifunctional photoinitiators, oligomeric or polymeric photoinitiators and polymerizable photoinitiators. Non-polymeric di- or multifunctional photoinitiators are considered to have a molecular weight between 300 and 900 Dalton. Non-polymerizable monofunctional photoinitiators with a molecular weight in that range are not diffusion hindered photoinitiators. Most preferably the diffusion hindered photoinitiator is a polymerizable initiator.

A suitable diffusion hindered photoinitiator may contain one or more photoinitiating functional groups derived from a Norrish type I-photoinitiator selected from the group consisting of benzoinethers, benzil ketals, α,α-dialkoxyacetophenones, α-hydroxyalkylphenones, α-aminoalkylphenones, acylphosphine oxides, acylphosphine sulphides, α-haloketones, α-halosulfones and phenylglyoxalates.

A suitable diffusion hindered photoinitiator may contain one or more photoinitiating functional groups derived from a Norrish type II-initiator selected from the group consisting of benzophenones, thioxanthones, 1,2-diketones and anthraquinones.

Suitable diffusion hindered photoinitiators are also those disclosed in EP 2053101 A in paragraphs [0074] and [0075] for difunctional and multifunctional photoinitiators, in paragraphs [0077] to [0080] for polymeric photoinitiators and in paragraphs [0081] to [0083] for polymerizable photoinitiators.

A preferred amount of photoinitiator is 0-50 wt %, more preferably 0.1-20 wt %, and most preferably 0.3-15 wt % of the total weight of the curable pigment dispersion or ink.

In order to increase the photosensitivity further, the curable pigment dispersion or ink may additionally contain co-initiators. Suitable examples of co-initiators can be categorized in 4 groups:
(1) tertiary aliphatic amines such as methyldiethanolamine, dimethylethanolamine, triethanolamine, triethylamine and N-methylmorpho line;
(2) aromatic amines such as amylparadimethylaminobenzoate, 2-n-butoxyethyl-4-(dimethylamino)benzoate, 2-(dimethylamino)ethylbenzoate, ethyl-4-(dimethylamino)benzoate, and 2-ethylhexyl-4-(dimethylamino)benzoate; and
(3) (meth)acrylated amines such as dialkylamino alkyl(meth)acrylates (e.g., diethylaminoethylacrylate) or N-morpholinoalkyl-(meth)acrylates (e.g., N-morpholinoethyl-acrylate). The preferred co-initiators are aminobenzoates.

When one or more co-initiators are included into the curable pigment dispersion or ink according to a preferred embodiment of the present invention, preferably these co-initiators are diffusion hindered for safety reasons, in particular for food packaging applications.

A diffusion hindered co-initiator is preferably selected from the group consisting of non-polymeric di- or multifunctional co-initiators, oligomeric or polymeric co-initiators and polymerizable co-initiators. More preferably the diffusion hindered co-initiator is selected from the group consisting of polymeric co-initiators and polymerizable co-initiators. Most preferably the diffusion hindered co-initiator is a polymerizable co-initiator.

A preferred diffusion hindered co-initiator is a polymeric co-initiator having a dendritic polymeric architecture, more preferably a hyperbranched polymeric architecture. Preferred hyperbranched polymeric co-initiators are those disclosed in US 2006/0014848 (AGFA) incorporated herein as a specific reference.

A more preferred diffusion hindered co-initiator is one or more polymerizable co-initiators. In a preferred embodiment the polymerizable co-initiator comprises at least one (meth)acrylate group, most preferably at least one acrylate group.

Preferred diffusion hindered co-initiators are the polymerizable co-initiators disclosed in EP 2053101 A (AGFA) in paragraphs [0088] and [0097].

The curable pigment dispersion or ink preferably comprises the polymerizable co-initiator in an amount of 0.1 to 50 wt %, more preferably in an amount of 0.5 to 25 wt %, most preferably in an amount of 1 to 10 wt % of the total weight of the ink.

Polymerization Inhibitors

The curable pigment dispersion may contain a polymerization inhibitor. Suitable polymerization inhibitors include phenol type antioxidants, hindered amine light stabilizers, phosphor type antioxidants, hydroquinone monomethyl ether commonly used in (meth)acrylate monomers, and hydroquinone, t-butylcatechol, pyrogallol may also be used.

Suitable commercial inhibitors are, for example, SUMILIZER™ GA-80, SUMILIZER™ GM and SUMILIZER™ GS produced by Sumitomo Chemical Co. Ltd.; GENORAD™ 16, GENORAD™ 18 and GENORAD™ 20 from Rahn AG; IRGASTAB™ UV10 and IRGASTAB™ UV22, TINUVIN™ 460 and CGS20 from Ciba Specialty Chemicals; FLOORSTAB™ UV range (UV-1, UV-2, UV-5 and UV-8) from Kromachem Ltd, ADDITOL™ S range (S100, 5110, 5120 and 5130) from Cytec Surface Specialties.

Since excessive addition of these polymerization inhibitors will lower the ink sensitivity to curing, it is preferred that the amount capable of preventing polymerization is determined prior to blending. The amount of a polymerization inhibitor is preferably lower than 2 wt % of the total pigment dispersion or ink.

Binders

Non-aqueous pigment dispersions based on organic solvents or oils preferably include a binder resin. The binder functions as a viscosity controlling agent and also provides fixability relative to the polymeric resin substrate, e.g. a polyvinyl chloride substrate, also called vinyl substrate. The binder must be selected to have a good solubility in the solvent(s).

Suitable examples of binder resins include acrylic resins, modified acrylic resins, styrene acrylic resins, acrylic copolymers, acrylate resins, aldehyde resins, rosins, rosin esters, modified rosins and modified rosin resins, acetyl polymers, acetal resins such as polyvinyl butyral, ketone resins, phenolic resins and modified phenolic resins, maleic resins and modified maleic resins, terpene resins, polyester resins, polyamide resins, polyurethane resins, epoxy resins, vinyl resins, vinyl chloride-vinyl acetate copolymer resins, cellulose type resins such as nitro cellulose, cellulose acetopropionate and cellulose acetate butyrate, and vinyl toluene-α-methylstylene copolymer resin. These binders may be used alone or in a mixture thereof. The binder is preferably a film-forming thermoplastic resin.

The amount of binder resin in a pigment dispersion or ink is preferably in the range of 0.1 to 30 wt %, more preferably 1 to 20 wt %, most preferably 2 to 10 wt % based on the total weight of the pigment dispersion or ink.

Surfactants

The pigment dispersion or ink may contain at least one surfactant. The surfactant(s) can be anionic, cationic, non-ionic, or zwitter-ionic and are usually added in a total quantity less than 20 wt % based on the total weight of the inkjet ink and particularly in a total less than 10 wt % based on the total weight of the pigment dispersion or ink.

Suitable surfactants include fluorinated surfactants, fatty acid salts, ester salts of a higher alcohol, alkylbenzene sulphonate salts, sulphosuccinate ester salts and phosphate ester salts of a higher alcohol (for example, sodium dodecylbenzenesulphonate and sodium dioctylsulphosuccinate), ethylene oxide adducts of a higher alcohol, ethylene oxide adducts of an alkylphenol, ethylene oxide adducts of a polyhydric alcohol fatty acid ester, and acetylene glycol and ethylene oxide adducts thereof (for example, polyoxyethylene nonylphenyl ether, and SURFYNOL™ 104, 104H, 440, 465 and TG available from AIR PRODUCTS & CHEMICALS INC.).

For non-aqueous inkjet inks preferred surfactants are selected from fluoro surfactants (such as fluorinated hydrocarbons) and silicone surfactants. The silicones are typically siloxanes and can be alkoxylated, polyether modified, polyether modified hydroxy functional, amine modified, epoxy modified and other modifications or combinations thereof. Preferred siloxanes are polymeric, for example polydimethylsiloxanes.

In a curable inkjet ink a fluorinated or silicone compound may be used as a surfactant, but preferably a cross-linkable surfactant is used. Polymerizable monomers having surface-active effects include silicone modified acrylates, silicone modified methacrylates, acrylated siloxanes, polyether modified acrylic modified siloxanes, fluorinated acrylates, and fluorinated methacrylates. Polymerizable monomers having surface-active effects can be mono-, di-, tri- or higher functional (meth)acrylates or mixtures thereof.

Humectants/Penetrants

Suitable humectants include triacetin, N-methyl-2-pyrrolidone, glycerol, urea, thiourea, ethylene urea, alkyl urea, alkyl thiourea, dialkyl urea and dialkyl thiourea, diols, including ethanediols, propanediols, propanetriols, butanediols, pentanediols, and hexanediols; glycols, including propylene glycol, polypropylene glycol, ethylene glycol, polyethylene glycol, diethylene glycol, tetraethylene glycol, and mixtures and derivatives thereof. Preferred humectants are triethylene glycol mono butylether, glycerol and 1,2-hexanediol. The humectant is preferably added to the inkjet ink formulation in an amount of 0.1 to 40 wt % of the formulation, more preferably 0.1 to 10 wt % of the formulation, and most preferably approximately 4.0 to 6.0 wt %.

Preparation of Pigment Dispersions and Inks

Pigment dispersions may be prepared by precipitating or milling the pigment in the dispersion medium in the presence of the dispersant.

Mixing apparatuses may include a pressure kneader, an open kneader, a planetary mixer, a dissolver, and a Dalton Universal Mixer. Suitable milling and dispersion apparatuses are a ball mill, a pearl mill, a colloid mill, a high-speed disperser, double rollers, a bead mill, a paint conditioner, and triple rollers. The dispersions may also be prepared using ultrasonic energy.

Many different types of materials may be used as milling media, such as glasses, ceramics, metals, and plastics. In a preferred embodiment, the grinding media can comprise particles, preferably substantially spherical in shape, e.g. beads consisting essentially of a polymeric resin or yttrium stabilized zirconium beads.

In the process of mixing, milling and dispersion, each process is performed with cooling to prevent build up of heat, and for radiation curable pigment dispersions as much as possible under light conditions in which actinic radiation has been substantially excluded.

The pigment dispersion may contain more than one pigment, the pigment dispersion or ink may be prepared using separate dispersions for each pigment, or alternatively several pigments may be mixed and co-milled in preparing the dispersion.

The dispersion process can be carried out in a continuous, batch or semi-batch mode.

The preferred amounts and ratios of the ingredients of the mill grind will vary widely depending upon the specific materials and the intended applications. The contents of the milling mixture comprise the mill grind and the milling media. The mill grind comprises pigment, polymeric dispersant and a liquid carrier. For inkjet inks, the pigment is usually present in the mill grind at 1 to 50 wt %, excluding the milling media. The weight ratio of pigment over polymeric dispersant is 20:1 to 1:2.

The milling time can vary widely and depends upon the pigment, mechanical means and residence conditions selected, the initial and desired final particle size, etc. In a preferred embodiment of the present invention pigment dispersions with an average particle size of less than 100 nm may be prepared.

After milling is completed, the milling media is separated from the milled particulate product (in either a dry or liquid dispersion form) using conventional separation techniques, such as by filtration, sieving through a mesh screen, and the like. Often the sieve is built into the mill, e.g. for a bead mill. The milled pigment concentrate is preferably separated from the milling media by filtration.

In general it is desirable to make inkjet inks in the form of a concentrated mill grind, which is subsequently diluted to the appropriate concentration for use in the inkjet printing system. This technique permits preparation of a greater quantity of pigmented ink from the equipment. By dilution, the inkjet ink is adjusted to the desired viscosity, surface tension, colour, hue, saturation density, and print area coverage for the particular application.

Spectral Separation Factor

The spectral separation factor SSF was found to be an excellent measure to characterize a pigmented inkjet ink, as it takes into account properties related to light-absorption (e.g. wavelength of maximum absorbance $\lambda_{max}$, shape of the absorption spectrum and absorbance-value at $\lambda_{max}$) as well as properties related to the dispersion quality and stability.

A measurement of the absorbance at a higher wavelength gives an indication on the shape of the absorption spectrum. The dispersion quality can be evaluated based on the phenomenon of light scattering induced by solid particles in solutions. When measured in transmission, light scattering in pigment inks may be detected as an increased absorbance at higher wavelengths than the absorbance peak of the actual pigment. The dispersion stability can be evaluated by comparing the SSF before and after a heat treatment of e.g. a week at 80° C.

The spectral separation factor SSF of the ink is calculated by using the data of the recorded spectrum of an ink solution or a jetted image on a substrate and comparing the maximum absorbance to the absorbance at a higher reference wavelength $\lambda_{ref}$. The spectral separation factor is calculated as the ratio of the maximum absorbance $A_{max}$ over the absorbance $A_{ref}$ at a reference wavelength.

$$SSF = \frac{A_{max}}{A_{ref}}$$

The SSF is an excellent tool to design inkjet ink sets with large colour gamut. Often inkjet ink sets are now commercialized, wherein the different inks are not sufficiently matched with each other. For example, the combined absorption of all inks does not give a complete absorption over the whole visible spectrum, e.g. "gaps" exist between the absorption spectra of the colorants. Another problem is that one ink might be absorbing in the range of another ink. The resulting colour gamut of these inkjet ink sets is low or mediocre.

EXAMPLES

Materials

All materials used in the following examples were readily available from standard sources such as ALDRICH CHEMICAL Co. (Belgium) and ACROS (Belgium) unless otherwise specified.

DMAPA is an abbreviation used for 3-(dimethylamino)-1-propylamine.

N3APIm is an abbreviation used for 1-(aminopropyl)imidazole.

4AMPy is an abbreviation used for 4-(aminomethyl)pyridine.

PPO-1 is an abbreviation used for the poly(propylene glycol) monobutyl ether graft (nBu-PPO-OH) having an average molecular weight $M_w$ of 1,000.

PPO-2 is an abbreviation used for the poly(propylene glycol) monobutyl ether graft (nBu-PPO-OH) having an average molecular weight $M_w$ of 340.

PPO-3 is an abbreviation used for the poly(propylene glycol) monobutyl ether graft (nBu-PPO-OH) having an average molecular weight $M_w$ of 2,500.

PE is an abbreviation used for the monohydroxyl polyester graft based on 5 units of epsilon-caprolacton and 1 units of delta-valerolactone (nOct-eCL$_5$-dVL$_1$-OH) with molecular weight of 717 and synthesized as follows:

200 g of n-octanol (1.536 mol), 2313.6 g of epsilon-caprolactone (20.277 mol) and 338.28 g of delta-valerolactone (3.379 mol) were introduced in a 5 L reactor, heated to 100° C. under constant stirring and degassed 30 min by nitrogen bubbling. 0.49 g of dibutyltin dilaurate (Aldrich 95%, 0.768 mmol) were added as a catalyst to the reaction mixture that was heated to 130° C. and stirred for 30 hours. 500 mL of ethyl acetate were added to the cooled reaction mixture (ca. 60° C.) and the solution was precipitated in a large excess of cold isooctane under constant stirring. The precipitated product, PE, was recovered by filtration, washed twice with isooctane and dried in a vacuum oven at 40° C.: m=2806.3 g, yield=98%.

PEO is an abbreviation used for poly(ethylene glycol) monomethyl ether graft (MeO-PEO-OH) having an average molecular weight $M_n$ of 1,100.

Linker-1 is an abbreviation for the dihydroxyl-functionalized poly(ethylene glycol) crosslinker with average $M_n$=380-420.

Linker-2 is an abbreviation for the dihydroxyl-functionalized poly(propylene glycol) crosslinker with average $M_n$=425.

HL is an abbreviation used for the polyisocyanate core DESMODUR

HL BA available from BAYER AG as a 60% solution in butylacetate.

NOVOPERM™ Yellow H2G is a C.I. Pigment Yellow 120 from CLARIANT.

HOSTAPERM™ Red E5B02 is a C.I. Pigment Violet 19 from CLARIANT.

SUNFAST™ blue 15:3 is C.I. Pigment Blue 15:3 from SUN CHEMICAL CORPORATION.

S5000 is the abbreviation used for the dispersion synergist SOLSPERSE™ 5000 from LUBRIZOL.

DEGDEE is diethylene glycol diethyl ether

Measurement Methods

1. Measurement of SSF

The spectral separation factor SSF of the ink was calculated by using the data of the recorded spectrum of an ink solution and comparing the maximum absorbance to the absorbance at a reference wavelength. The reference wavelength is dependent on the pigment(s) used:

If the colour ink has a maximum absorbance $A_{max}$ between 400 and 500 nm then the absorbance $A_{ref}$ must be determined at a reference wavelength of 600 nm, If the colour ink has a maximum absorbance $A_{max}$ between 500 and 600 nm then the absorbance $A_{ref}$ must be determined at a reference wavelength of 650 nm, If the colour ink has a maximum absorbance $A_{max}$ between 600 and 700 nm then the absorbance $A_{ref}$ must be determined at a reference wavelength of 830 nm.

The absorbance was determined in transmission with a Shimadzu UV-2101 PC double beam-spectrophotometer. The inks were diluted with ethyl acetate to have a pigment concentration according to Table 3.

TABLE 3

| Inkjet ink with maximum absorbance $A_{max}$ | Pigment concentration |
|---|---|
| between 400 and 500 nm | 0.002% |
| between 500 and 600 nm | 0.005% |
| between 600 and 700 nm | 0.002% |

A spectrophotometric measurement of the UV-VIS-NIR absorption spectrum of the diluted ink was performed in transmission-mode with a double beam-spectrophotometer using the settings of Table 4. Quartz cells with a path length of 10 mm were used and ethyl acetate was chosen as a blank.

TABLE 4

| Mode | Absorbance |
|---|---|
| Wavelength range | 240-900 nm |
| Slit width | 2.0 nm |
| Scan interval | 1.0 nm |
| Scan speed | Fast (1165 nm/min) |
| Detector | photo-multiplier (UV-VIS) |

Efficient pigmented inkjet inks exhibiting a narrow absorption spectrum and a high maximum absorbance have a value for SSF of at least 30.

2. Pigment Dispersion Stability

The dispersion stability was evaluated by comparing the SSF before and after a heat treatment of one week at 80° C. Pigmented inkjet inks exhibiting good dispersion stability have a SSF after heat treatment still larger than 30 and a loss in SSF of no more than 30% for an inkjet ink.

Example 1

This example illustrates the synthesis method of polymeric dispersants in accordance with preferred embodiments of the present invention.

Synthesis of Polymeric Dispersant D-13

10 g of poly(propylene glycol) PPO-1 and 12.8 g of a 10% solution of linker-2 in ethylacetate were dissolved in 57 mL of ethylacetate in a 0.25 L three-neck round-bottom flask and stirred at room temperature under nitrogen atmosphere. An aliquot of dibutyltin dilaurate and 16 g of HL diluted in 16 g of ethylacetate were injected to the flask. The reaction mixture was stirred at 60° C. for 8 hours before the injection of 2.8 g of 4AMPy. The reaction mixture was then stirred at 60° C. for 8 hours and at 23° C. for 8 hours. After addition of 2 mL of ethanol, the solvents were evaporated under reduced pressure at 40° C. and dried in a vacuum oven at 35° C. 23.2 g of polymeric dispersant D-13 were recovered as a white powder (yield=99%).

Other Polymeric Dispersants

All other polymeric dispersants used in EXAMPLE 2 were prepared in exactly the same manner by using the grafts, crosslinkers and anchors in the amounts indicated by Table 5 in the synthesis on the polyisocyanate core HL. The graft-feed shows the nature and amount of the graft used in the preparation of the polymeric dispersant by expressing it as a mol % with respect to the total number of isocyanate functions present in the core. The crosslinker-feed shows the amount used in the preparation of the polymeric dispersant by expressing it as a mol % with respect to the total number of isocyanate functions present in the core. The anchor-feed shows the nature and the amount of anchor used in the preparation of the polymeric dispersant by expressing it as a mol % with respect to the total number of isocyanate functions present in the core.

TABLE 5

| Polymeric Dispersant | Graft-feed | | Crosslinker-feed | | Anchor-feed | |
|---|---|---|---|---|---|---|
| | Type | mol % | Type | mol % | Type | mol % |
| D-1 | PE | 39 | Linker-1 | 20 | N3APIm | 41 |
| D-2 | PPO-1 | 25 | Linker-2 | 15 | N3APIm | 60 |
| D-3 | PPO-1 | 25 | Linker-2 | 15 | DMAPA | 60 |
| D-4 | PPO-1 | 25 | Linker-1 | 15 | 4AMPy | 60 |
| D-5 | PPO-1 | 25 | Linker-1 | 5 | 4AMPy | 70 |
| D-6 | PPO-1 | 25 | Linker-1 | 5 | 4AMPy | 70 |
| D-7 | PPO-1 | 25 | Linker-1 | 10 | 4AMPy | 65 |
| D-8 | PPO-1 | 10 | Linker-2 | 15 | 4AMPy | 75 |
| D-9 | PPO-1 | 10 | Linker-2 | 20 | 4AMPy | 70 |
| D-10 | PPO-1 | 50 | Linker-2 | 25 | 4AMPy | 25 |
| D-11 | PPO-1 | 25 | Linker-1 | 20 | 4AMPy | 55 |
| D-12 | PEO | 25 | Linker-2 | 15 | 4AMPy | 60 |
| D-13 | PPO-1 | 25 | Linker-2 | 10 | 4AMPy | 65 |
| D-14 | PPO-1 | 25 | Linker-2 | 15 | 4AMPy | 60 |
| D-15 | PPO-1 | 40 | Linker-2 | 5 | 4AMPy | 55 |
| D-16 | PPO-1 | 25 | Linker-2 | 20 | 4AMPy | 55 |
| D-17 | PPO-1 | 35 | Linker-2 | 15 | 4AMPy | 50 |
| D-18 | PPO-1 | 40 | Linker-2 | 15 | 4AMPy | 45 |
| D-19 | PPO-1 | 35 | Linker-2 | 25 | 4AMPy | 40 |
| D-20 | PPO-3 | 25 | Linker-2 | 15 | 4AMPy | 60 |

The molecular weight of the polymeric dispersants ($M_n$, $M_w$, $M_w/M_n$) was determined by size exclusion chromatography using dimethyl acetamide/0.21% LiCl/0.63% acetic acid as an eluent and 3 mixed-B columns which were calibrated against linear polystyrene standards. The analytical results are given in Table 6.

TABLE 6

| Polymeric dispersant | $M_n$ | $M_z$ | $M_w/M_n$ |
|---|---|---|---|
| D-1 | 26,014 | 279,123 | 4.71 |
| D-2 | 15,860 | 315,933 | 5.17 |
| D-3 | 12,305 | 59,998 | 2.26 |
| D-4 | 14,791 | 266,895 | 5.56 |
| D-5 | 11,285 | 67,486 | 2.48 |
| D-6 | 10,908 | 40,101 | 1.87 |
| D-7 | 13,767 | 132,641 | 3.69 |
| D-8 | 14,020 | 280,318 | 5.35 |
| D-9 | 14,855 | 174,120 | 3.84 |
| D-10 | 18,332 | 128,169 | 3.18 |
| D-11 | 17,021 | 710,641 | 10.6 |
| D-12 | 38,784 | 400,823 | 4.89 |
| D-13 | 12,866 | 69,117 | 2.38 |
| D-14 | 12,572 | 62,310 | 2.26 |
| D-15 | 12,218 | 54,909 | 2.16 |
| D-16 | 14,255 | 93,012 | 2.73 |
| D-17 | 14,600 | 86,635 | 2.74 |
| D-18 | 14,799 | 86,528 | 2.64 |
| D-19 | 17,365 | 140,736 | 3.53 |
| D-20 | 19,385 | 210,548 | 3.72 |

Example 2

This example illustrates the advantages in dispersion quality stability of the polymeric dispersant in accordance with a preferred embodiment of the present invention for preparing a CMY-inkjet ink set.

Preparation of Inkjet Inks

All inkjet inks were prepared in the same manner to obtain a composition as described in Table 7.

TABLE 7

| wt % of component | Yellow ink | Magenta ink | Cyan ink |
|---|---|---|---|
| NOVOPERM ™ Yellow H2G | 5.00 | — | — |
| HOSTAPERM ™ Red E5B02 | — | 5.00 | — |
| SUNFAST ™ blue 15:3 | — | — | 5.00 |
| Pigment synergist S5000 | — | — | 1.25 |
| Polymeric dispersant | 5.00 | 5.00 | 5.00 |
| DEGDEE | 90.00 | 90.00 | 88.75 |

The comparative inkjet ink sets COMP-1 to COMP-12 and the inventive inkjet ink sets INV-1 to INV-8 were made using the polymeric dispersant according to Table 8 in each of the yellow, magenta and cyan inks. An inkjet ink was made by mixing the pigment, the polymeric dispersant and the organic solvent DEGDEE with a dissolver and subsequently treating this mixture with a roller mill procedure using yttrium-stabilized zirconium oxide-beads of 0.4 mm diameter ("high wear resistant zirconia grinding media" from TOSOH Co.). A polyethylene flask of 60 mL was filled to half its volume with grinding beads and 20 mL of the mixture. The flask was closed with a lit and put on the roller mill for three days. The speed was set at 150 rpm. After milling, the dispersion was separated from the beads using a filter cloth.

TABLE 8

| Inkjet Ink set | Polymeric Dispersant |
|---|---|
| COMP-1 | D-1 |
| COMP-2 | D-2 |
| COMP-3 | D-3 |
| COMP-4 | D-4 |
| COMP-5 | D-5 |
| COMP-6 | D-6 |
| COMP-7 | D-7 |
| COMP-8 | D-8 |
| COMP-9 | D-9 |
| COMP-10 | D-10 |
| COMP-11 | D-11 |
| COMP-12 | D-12 |
| INV-1 | D-13 |
| INV-2 | D-14 |
| INV-3 | D-15 |
| INV-4 | D-16 |
| INV-5 | D-17 |
| INV-6 | D-18 |
| INV-7 | D-19 |
| INV-8 | D-20 |

Evaluation and Results

The spectral separation factor (SSF) of each ink was determined directly after preparation as well as after a heat treatment of one week at 80° C. The results for the comparative inkjet ink sets COMP-1 to COMP-12 and inventive inkjet ink sets INV-1 to INV-8 are given in Table 9. "FLOC" means that flocculation of the ink was observed. "GEL" means that a jellification of the ink was observed.

TABLE 9

| Inkjet ink set | Yellow ink | | Magenta Ink | | Cyan ink | |
|---|---|---|---|---|---|---|
| | SSF | % Loss | SSF | % Loss | SSF | % Loss |
| COMP-1 | 47 | 72% | 50 | 90% | 51 | 0% |
| COMP-2 | 97 | 47% | 129 | 80% | 65 | 0% |
| COMP-3 | 130 | 57% | 129 | 90% | 104 | 29% |
| COMP-4 | 52 | 0% | 80 | 40% | 57 | 0% |

TABLE 9-continued

| Inkjet ink set | Yellow ink SSF | Yellow ink % Loss | Magenta Ink SSF | Magenta Ink % Loss | Cyan ink SSF | Cyan ink % Loss |
|---|---|---|---|---|---|---|
| COMP-5 | 66 | 0% | 87 | GEL | 56 | 0% |
| COMP-6 | 92 | 34% | 79 | 61% | 70 | 0% |
| COMP-7 | 68 | 13% | 56 | 45% | 39 | 0% |
| COMP-8 | 21 | FLOC | 9 | FLOC | 38 | FLOC |
| COMP-9 | | | FLOC | | | |
| COMP-10 | 39 | 26% | 119 | 0% | 101 | 0% |
| COMP-11 | 53 | 11% | 76 | 32% | 64 | 0% |
| COMP-12 | | | FLOC | | | |
| INV-1 | 96 | 30% | 101 | 23% | 61 | 0% |
| INV-2 | 136 | 11% | 112 | 4% | 99 | 9% |
| INV-3 | 96 | 28% | 123 | 13% | 72 | 0% |
| INV-4 | 145 | 28% | 119 | 0% | 101 | 0% |
| INV-5 | 37 | 0% | 110 | 0% | 111 | 10% |
| INV-6 | 88 | 22% | 105 | 7% | 86 | 0% |
| INV-7 | 38 | 0% | 85 | 4% | 102 | 0% |
| INV-8 | 40 | 3% | 89 | 0% | 140 | 16% |

From Table 9, it should be clear that the polymeric dispersants of preferred embodiments of the present invention work well in all inks of an inkjet ink set. The advantage of such a "universal" polymeric dispersant is that it is not necessary to use different polymeric dispersants for different colour inkjet inks in order to have optimal dispersion quality and stability. The use of different polymeric dispersants in different colour inkjet inks of the ink set may lead to additional problems in jetting performance due to inherent differences of polymeric dispersants in viscosity and interaction with other ink components and with the ink receiver.

The invention claimed is:

1. A polymeric dispersant having a hyperbranched polyurethane architecture obtained by reacting a polyisocyanate core with a mixture of:
   a) 40 to 65 mol % of an anchor represented by Formula (I) and/or (II):

Formula (I)

Formula (II)

wherein n represents an integer selected from 0 to 7; and X and Y each independently represent a primary amine group or a hydroxyl group;
   b) 5 to 25 mol % of a polypropylene oxide crosslinker; and
   c) 15 to 40 mol % of a polypropylene oxide graft; wherein the amount of the crosslinker and the graft taken together is at least 35 mol %; and
   100 mol % of the mixture corresponds with a total amount of isocyanate groups in the polyisocyanate core.

2. The polymeric dispersant according to claim 1, wherein the mixture includes 50 to 60 mol % of the anchor.

3. The polymeric dispersant according to claim 1, wherein the mixture includes 15 to 25 mol % of the polypropylene oxide crosslinker.

4. The polymeric dispersant according to claim 2, wherein the mixture includes 15 to 25 mol % of the polypropylene oxide crosslinker.

5. The polymeric dispersant according to claim 1, wherein the mixture includes 25 to 35 mol % of the polypropylene oxide graft.

6. The polymeric dispersant according to claim 2, wherein the mixture includes 25 to 35 mol % of the polypropylene oxide graft.

7. The polymeric dispersant according to claim 1, wherein the polypropylene oxide crosslinker has an average numerical molecular weight $M_n$ between 400 and 2,500.

8. The polymeric dispersant according to claim 1, wherein the polypropylene oxide graft has an average numerical molecular weight $M_n$ between 500 and 5,000.

9. The polymeric dispersant according to claim 1, wherein the polymeric dispersant has an average numerical molecular weight $M_n$ of less than 25,000.

10. A non-aqueous pigment dispersion comprising:
    a pigment;
    a non-aqueous dispersion medium; and
    the polymeric dispersant according to claim 1.

11. A non-aqueous pigment dispersion comprising:
    a pigment;
    a non-aqueous dispersion medium; and
    the polymeric dispersant according to claim 1; wherein the non-aqueous dispersion medium is a radiation curable liquid which is curable by UV-radiation or e-beam.

12. An inkjet ink comprising:
    the non-aqueous pigment dispersion according to claim 10.

13. An inkjet ink comprising:
    the non-aqueous pigment dispersion according to claim 11.

14. An inkjet ink set comprising:
    at least two inkjet inks according to claim 12.

15. A method for preparing a non-aqueous pigment dispersion comprising the steps:
    a) providing a polymeric dispersant according to claim 1; and
    b) dispersing a pigment in the presence of the polymeric dispersant in a non-aqueous dispersion medium.

16. The method according to claim 15, wherein the non-aqueous dispersion medium is a radiation curable liquid which is curable by UV-radiation or e-beam.

17. The method according to claim 15, wherein the pigment dispersion is an inkjet ink.

18. An inkjet printing method comprising the steps:
    a) providing an inkjet ink including a pigment, a non-aqueous dispersion medium, and the polymeric dispersant according to claim 1; and
    b) jetting the inkjet ink onto an ink-receiver.

19. The inkjet printing method according to claim 18, wherein the non-aqueous dispersion medium is a radiation curable liquid which is curable by UV-radiation or e-beam.

* * * * *